US008855555B2

(12) United States Patent
Hill et al.

(10) Patent No.: US 8,855,555 B2
(45) Date of Patent: Oct. 7, 2014

(54) MOBILE WIRELESS COMMUNICATIONS DEVICE PROVIDING SELECTIVE IMAGE DISPLAY BASED UPON NEAR FIELD COMMUNICATION (NFC) AND RELATED METHODS

(75) Inventors: Thomas C. Hill, Crystal Lake, IL (US); Michael Joseph DeLuca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 685 days.

(21) Appl. No.: 13/033,759

(22) Filed: Feb. 24, 2011

(65) Prior Publication Data

US 2012/0220219 A1 Aug. 30, 2012

(51) Int. Cl.
H04B 5/00 (2006.01)
G06K 19/077 (2006.01)
H04M 1/725 (2006.01)
H04M 1/02 (2006.01)

(52) U.S. Cl.
CPC ......... *H04M 1/7253* (2013.01); *G06K 19/0776* (2013.01); *H04M 2250/10* (2013.01); *H04M 2250/04* (2013.01); *H04M 2250/16* (2013.01); *H04M 1/0283* (2013.01)
USPC ........ 455/41.1; 455/466; 455/566; 455/456.1

(58) Field of Classification Search
USPC .................. 345/107, 169, 901, 905, 1.1–3.4, 345/87–104
See application file for complete search history.

(56) References Cited

U.S. PATENT DOCUMENTS 7,057,591 B1 * 6/2006 Hautanen et al. ............... 345/87
7,457,760 B1 11/2008 Harris et al.
7,983,413 B2 * 7/2011 Nelson .......................... 379/434
8,319,742 B2 * 11/2012 Doktorova et al. ............ 345/173
2006/0124897 A1 * 6/2006 Shingai et al. ............ 252/299.01

(Continued)

FOREIGN PATENT DOCUMENTS

| EP | 1686446 | 8/2006 |
| EP | 2076001 | 7/2009 |
| JP | 2006157725 | 6/2006 |
| WO | 03009484 | 1/2003 |

OTHER PUBLICATIONS

Sarah Clark "*Fonelabs Launches Range of Low-Cost NFC Phones*" NearFieldCommunicationsWorld.com Mar. 12, 2009 http://www.nearfieldcommunicationsworld.com/2009/03/12/3856/fonelabs-launches-range-of-low-cost-nfc-phones.

(Continued)

*Primary Examiner* — Fayyaz Alam
*Assistant Examiner* — Mohammed Rachedine
(74) *Attorney, Agent, or Firm* — Allen, Dyer, Doppelt, Milbrath & Gilchrist, P.A.

(57) ABSTRACT

A mobile wireless communications device may include a portable housing, wireless transceiver circuitry carried by the portable housing, and a first display carried by the portable housing. The mobile wireless communications device may also include a processor carried by the portable housing and coupled to the wireless transceiver circuitry and the first display, and a second display carried by the portable housing. The second display may include an array of pixels. Each pixel may retain a given state between refreshes and without electrical power supplied thereto. The mobile wireless communications device may also include a near-field communications (NFC) device carried by the portable housing and cooperating with the second display to display an image thereon based upon NFC communications.

20 Claims, 6 Drawing Sheets

(56) References Cited

U.S. PATENT DOCUMENTS

| | | | |
|---|---|---|---|
| 2007/0057792 A1 | 3/2007 | Alden | |
| 2008/0110067 A1* | 5/2008 | Smith et al. | 40/541 |
| 2009/0137204 A1 | 5/2009 | Chang | 455/41.1 |
| 2009/0275308 A1 | 11/2009 | Valdez et al. | |
| 2010/0048252 A1* | 2/2010 | Kang et al. | 455/566 |
| 2010/0099445 A1* | 4/2010 | Song et al. | 455/466 |
| 2010/0207575 A1* | 8/2010 | Pijnenburg et al. | 320/108 |
| 2011/0143769 A1* | 6/2011 | Jones et al. | 455/456.1 |

OTHER PUBLICATIONS

Motorola FONE F3 http://en.wikipedia.org/wiki/Motorola_FONE_F3: Printed Feb. 18, 2011.

Timo Arnall "*The Address Book Desk*" http://www.elasticspace.com/2005/12/address-book-desk: Printed Feb. 18, 2011.

Patauner et al. "*High Speed RID/NFC at the Freqeuency of 13.56 MHz*" http://www.eurasip.org/Proceedings/Ext/RFID2007/pdf/s1p4.pdf Printed Feb. 18, 2011.

Francesco D'Elia "*Paossible INRIA post doc: Towards a Secure Internet of Things made of RFID/NFC*" http://www.comics.unina.it/index.php?option=com_content&task=view&id=2268&Itemid=1 : Mar. 10, 2009.

"*Low-cost temperature sensor to add to FRID inlays*" http://www.usingrfid.com/news/read.asp?lc=w2355rx755zo: Jul. 11, 2006.

http://jkontherun.com/2010/01/06/beam-powerpoint-from-blackberry-to-projector-sans-wires/.

"*E-Ink Electronic Paper Displays*" http://www.eink.com/kits/index.html: Printed Oct. 12, 2010.

SiliconIndia "*IBM developing energy and retail technology of the future*" http://www.siliconindia.com/shownews/IBM_developing_energy_and_retail_technology_of_the_future-nid-64012.html: Dec. 22, 2009.

"*Advanced Technology in the Year 2010*" http://www.moratmarit.com/2009/07/advanced-technology-in-year-2010: Jul. 12, 2010.

Kent Displays Creates Color-Changing Skin for Phones http://www.phonescoop.com/news/item.php?n=3553 Printed Feb. 23, 2011.

Smart Skins http://www.research.philips.com/downloads/password/download/pw36_smart_skins.pdf Feb. 23, 2011.

Dan Balaban Smartphone Makers Weigh Move to NFC Published: Feb. 1, 2010 http://www.nfctimes.com/report/smartphone-makers-weigh-move-nfc.

Near Field Communication Coming to Android http://www.intomobile.com/2010/04/26/near-field-communication-to-hit-android-phones/nfcexample/ Monday, Apr. 26, 2010 at 12:50 PM PST.

E Ink with E Ink enabled products, http://www.eink.com Printed 0/6/2011.

NTERA-NanoChromics Technology http://www.ntera.com Printed Jan. 6, 2011.

Electronic paper http://en.wikipedia.org/wiki/electronic_paper Printed Dec. 3, 2010.

Mary O'Connor "RFID Enabled Phone Skins for Mobile Payments" RFID Hournal http://www.rfidjournal.com/article/print/5021 Printed Aug. 30, 2010.

"Nokia introducing smartphone with NFC & SWP{ capabilities" http://www.cellphonesmarket.com/news/nokia-introducing-smartphone-nfc-swp-capabilities/ Printed Aug. 30, 2010.

Clarke; "Parrot builds Innovision tags into easy-to-use digital photo frames" http://www.nearfieldcommunicationsworld.com/2008/11/27/3291/parrot-builds-innovision-tags-into-easy-to-use-digital-photo-frames/ Nov. 27, 2008.

U.S. Appl. No. 13/033,819, filed Feb. 24, 2011, DeLuca et al.

\* cited by examiner

MOBILE WIRELESS COMMUNICATIONS DEVICE PROVIDING SELECTIVE IMAGE DISPLAY BASED UPON NEAR FIELD COMMUNICATION (NFC) AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a mobile wireless communications device is disclosed herein which may include a portable housing, wireless transceiver circuitry carried by the portable housing, and a first display carried by the portable housing. The mobile wireless communications device may also include a processor carried by the portable housing and coupled to the wireless transceiver circuitry and the first display, and a second display carried by the portable housing. The second display may include an array of pixels, for example. Each pixel may retain a given state between refreshes and without electrical power supplied thereto. The mobile wireless communications device may also include a near-field communications (NFC) device carried by the portable housing and cooperating with the second display to display an image thereon based upon NFC communications, for example.

The NFC device and the second display may be configured to be powered by a field received by the NFC device. The mobile wireless communications device may further include a power source carried by the portable housing and coupled to the NFC device, for example.

The mobile wireless communications device may further include a substrate supporting the second display and the NFC device. An adhesive layer may secure the substrate to the portable housing, for example. The portable housing may include a front exterior surface carrying the first display and a rear exterior surface carrying the second display.

The mobile wireless communication device may further include a position determining device carried by the portable housing and configured to change the image on the second display based upon a determined geographic position, for example. The mobile wireless communications device may additionally or alternatively include a timer carried by the portable housing and configured to change the image on the second display based upon time, for example.

The NFC device may be configured to transmit an image-related NFC communication. The second display may include a color display, for example.

A related method aspect directed to a communications method for a mobile wireless communications device which may include a portable housing, wireless transceiver circuitry carried by the portable housing, a first display carried by the portable housing, a processor carried by the portable housing and coupled to the wireless transceiver circuitry and the first display, a second display carried by the portable housing and comprising an array of pixels, where each pixel retains a given state between refreshes and without electrical power supplied thereto, and a near-field communications (NFC) device carried by the portable housing. The method may include receiving NFC communications at the NFC device and displaying an image on the second display based upon the NFC communications.

Figure 1:
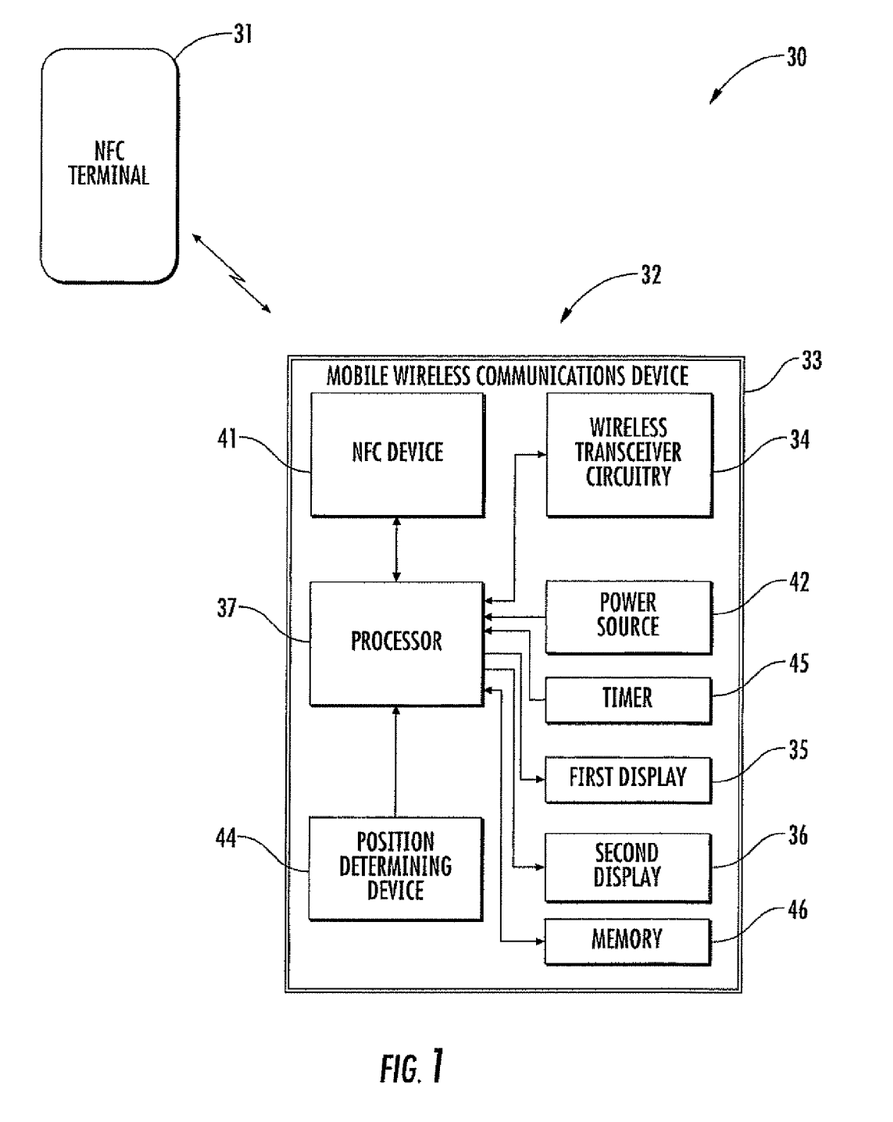
FIG. 1 is a schematic block diagram of a communications system in accordance with an example embodiment.
Figure 2:
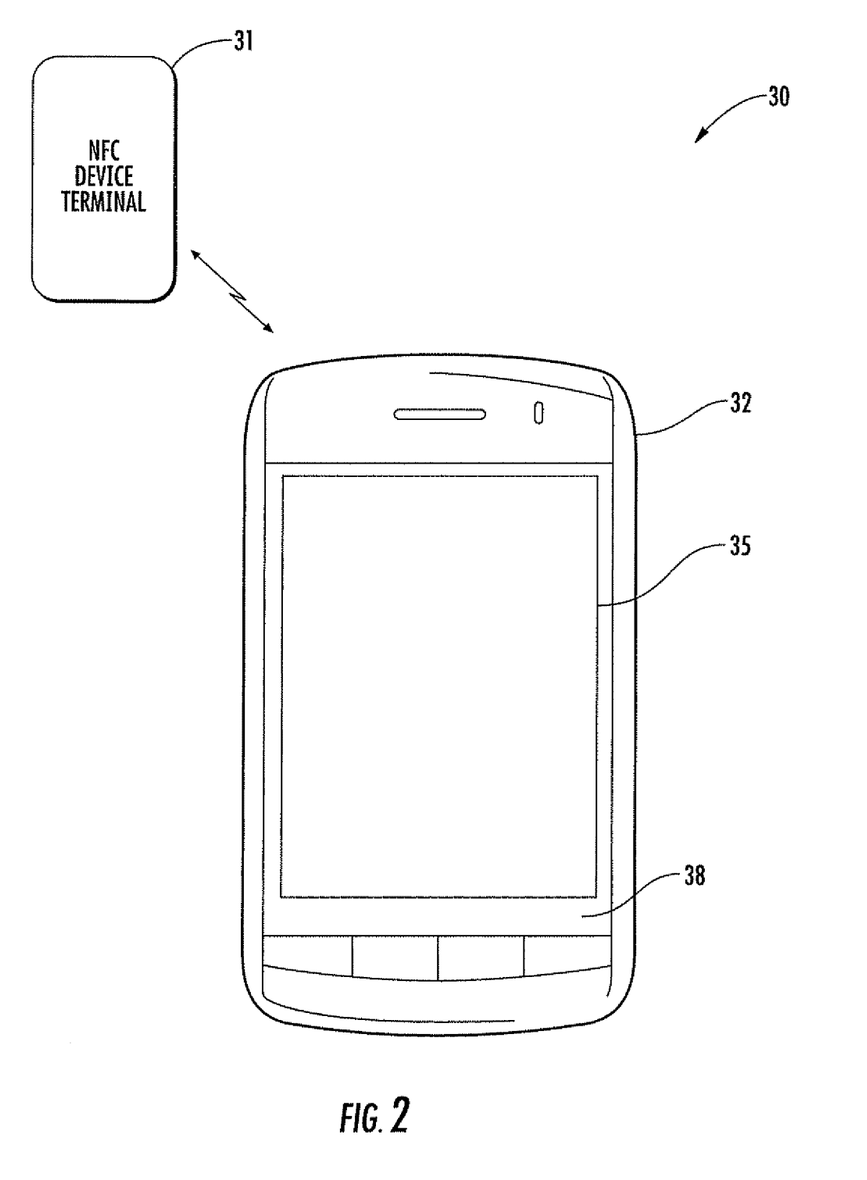
FIG. 2 is a schematic diagram of the communications system of FIG. 1 showing the front exterior surface of the mobile device.
Figure 3:
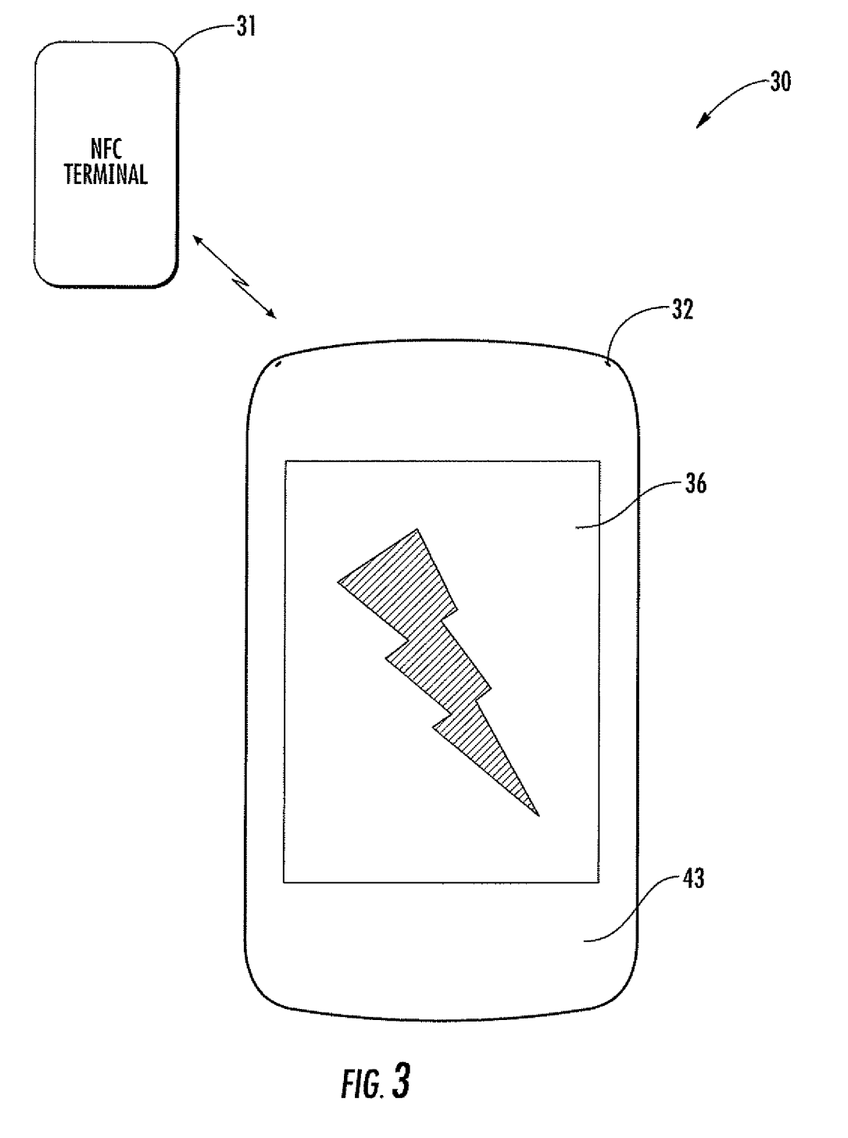
FIG. 3 is a schematic diagram of the communications system of FIG. 1 showing the rear exterior surface of the mobile device.

Referring initially to FIGS. 1-3, a communications system 30 illustratively includes a near field communication (NFC) terminal 31 associated with an object, and a mobile wireless communications device 32 (also referred to as a "mobile device" herein). Example mobile wireless communications devices may include portable or personal media players (e.g., music or MP3 players, video players, etc.), portable gaming devices, portable or mobile telephones, smartphones, tablet computers, digital cameras, etc.

The mobile device 32 illustratively includes a portable housing 33 and wireless transceiver circuitry 34 carried by the portable housing. The wireless transceiver circuitry 34 may be cellular transceiver circuitry or other type of wireless communications circuitry, and may communicate any combination of voice and data, for example, email.

The mobile device 32 includes a front exterior surface 38 (FIG. 2). A first display 35 is carried by the front exterior surface of the portable housing 33. The first display 35 may be a liquid crystal display (LCD) and may be configured to display information relating to a data or voice communications. This first display 35 may be in the form of an active display that includes a backlight and, hence, draws power whenever it is in operation. For example, the first display 35 may display email information, contact information, or call information. The first display 35 may be another type of display, and may display other information.

The mobile device 32 also includes a processor 37 that is carried the portable housing 33 and coupled to the wireless transceiver circuitry 34 and the first display 35. The processor 37 may be implemented using hardware (e.g., memory, etc.) and software components, i.e., computer-readable instructions for causing the mobile device 32 to perform the various functions or operations described herein.

A second display 36 is carried by the rear exterior surface 43 (FIG. 3) of the portable housing 33. The second display 36 includes an array of pixels. Each pixel of the array retains a given state between refreshes and retains the given state without electrical power supplied thereto. In other words, the second display 36 may comprise a passive display, for example. The second display 36 may comprise electronic paper, e-paper, or an electronic ink display, for example. Indeed, the second display 36 generally mimics the appearance of ordinary ink on paper, and unlike a conventional flat panel, or active display, which typically uses a backlight to illuminate its pixels, the second display reflects light like ordinary paper, for example. The second display 36 may be a color display as well as a black and white or monochrome version in some embodiments. Also, color pixels may be used together with black and white pixels to simulate a mixed color display, for example.

The second display 36 being carried by the rear exterior surface 43 of the portable housing 33 may be configured to operate as an e-skin or smartphone skin, or a nanochromatic technology based display, for example. In other words, the second display 36 may be large enough so that a change in appearance gives the impression that the rear exterior surface 43 of the portable housing 33 is changing in color, for example. In some exemplary embodiments, the second display 36 may be carried on the front exterior surface 38 or both the front and rear surfaces. More than one second display 36 may also be used.

The mobile device 32 also includes an NFC device 41. The NFC device 41 is carried by the portable housing 33 and cooperates with the second display 36 to display an image thereon based upon NFC communications. For example, the NFC device 41 may communicate with the NFC terminal 31 based upon proximity thereto using NFC communication. The NFC terminal 31 may be an NFC tag, an NFC-enabled mobile device, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The mobile device 32 also includes a power source 42. For example, the power source 42 may be a rechargeable battery. Other types of power sources may be used. The second display 36 and the NFC device 41 may be powered by the power source 42 in some embodiments.

In one example, the mobile device 32 may be configured to communicate with an NFC terminal 31 at a sporting event, for example. When in proximity to the NFC terminal 31, based upon NFC communications, the NFC device 41 may cooperate with the processor 37 of the mobile device 32 to display an image, for example, a team logo (the lightening bolt in FIG. 3), on the second display 36. The image received from the NFC terminal 31 may be stored in a memory 46 of the mobile device 32. The second display 36, as a passive display, typically has reduced refresh rates as compared to an active display, for example, which may make it particularly advantageous for displaying a static image or logo for an extended duration, for example, during the sporting event. Of course, other types of images may be displayed, including, for example, team colors, mascots, etc. Alternatively, or additionally, the second display 36 may be cleared, i.e., displaying no image, based upon the NFC communications. In some example embodiments, the second display 36 may be cleared via an input device (not shown).

The mobile device 32 also includes a position determining device 44 carried by the portable housing 33. The position determining device 44 may be a global positioning system (GPS) device, for example. The position determining device 44 advantageously cooperates with the processor 37 and second display 36 to change the display, or display an image, based upon a geographical location, for example. Referring to the example of the sporting event, the processor 37 may cooperate with the position determining device 44 to change the image on the second display 36 from the team logo to another image or default image, which may be stored in the memory 46, for example, when the mobile device 32 is outside the sporting event venue. Other geographical associations may also be used. For example, the team logo may be removed from the memory 46 upon a change in location, such as upon returning to a home or office. In some example embodiments, the team logo may be removed from the second display 36 via an input device (not shown) or based upon NFC communication.

Alternatively or additionally, a timer 45, also carried by the portable housing 33, may be configured to change the image on the second display 36 based upon time, or remove the image from the memory 46 also based upon time. Referring again to the example of the sporting event, the timer 45 may be configured to change the image on the second display 36 from the team logo to another image or default image stored in the memory 46 at a time after the game is over. For example, the timer 45 may be set to change the team logo six hours after NFC communications with the NFC terminal 31. Additionally, an event may reset or cancel the timer 45. For example, if the image or team logo is a "for purchase" image, and the image is purchased before the timer 45 expires, the image may not be changed or removed from the memory 46. In other words, the image may be a "temporary" image which may be purged from the memory 46 if it is not purchased prior to the expiration of the timer 45. Other events may cancel or reset the timer 45.

Indeed, while the communications system 30 has been described with respect to a sporting event, the communications system may be used with other types of images and in other locations. For example, the communications system may be used for clubs, teams, etc., and the second display 36 may be changed for different environments while at school, at home, or with friends, for example.

The NFC device 41 is also configured to transmit an NFC communication relating to the image. For example, the NFC device 41 may transfer the image, via an NFC communication, to an NFC device of another mobile device (not shown). In other words, the images may be shared between mobile devices based upon proximity. Additionally, the NFC communications may be between more than one device based upon proximity, and need not be just a one-to-one NFC communication. In other words, the images may be shared among multiple devices.

Figure 4:
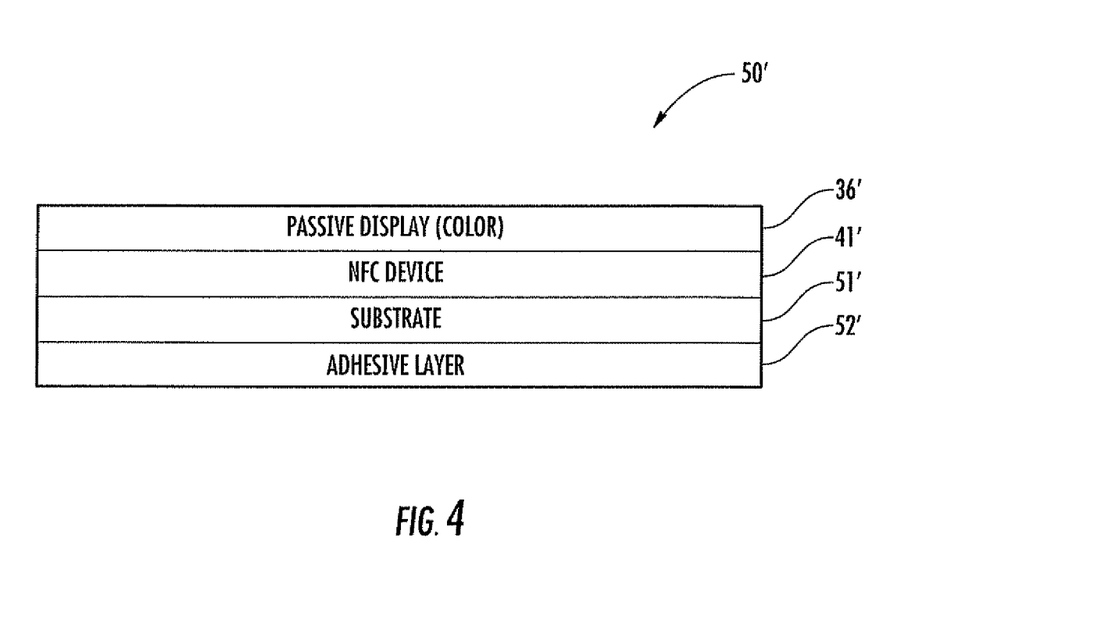
FIG. 4 is a schematic side view diagram of an electronic device in accordance with another example embodiment.

Referring now additionally to FIG. 4, in another exemplary embodiment, an electronic device 50' includes a substrate 51' and a display 36' carried by the substrate. The substrate 51' may be a flexible, plastic sheet, for example. In some embodiments, the substrate 51' may be a rigid sheet or layer and formed from other materials.

The display 36' is similar to the passive display described above with respect to FIGS. 1-3 in that each pixel of the array retains a given state between refreshes and retains the given state without electrical power supplied thereto. The display 36', by virtue of the substrate 51' being flexible, for example, may also be flexible.

An NFC device 41' is carried by the substrate 51' and cooperates with the display 36' to display an image thereon based upon NFC communications. An adhesive layer 52' is also carried by an outer surface of the substrate 51'. The adhesive layer 52' may be a pressure sensitive adhesive, for example. The adhesive layer 52' may include other types of adhesives. A release layer (not shown) may be positioned over the adhesive layer 52' prior to application of the device 50' to a desired surface.

The NFC device 41' and the display 36' are advantageously powered by a field received by the NFC device 41'. For example, the field may be an electromagnetic field, which in some example embodiments may be inclusive of the NFC communications. Being powered by an electromagnetic field, for example, reduces reliance on a separate power source, for example, a battery, to be carried the substrate 51', thus reducing the weight and complexity of the electronic device 50'.

Indeed, the electronic device 50' may be a stand-alone device, which is advantageously configured as a sticker. In other words, the electronic device 50' operates independently from other circuitry or elements, for example, of a mobile device. The electronic device 50', or sticker, may be affixed to a mobile wireless communications device or other device as an aftermarket item, that does not include an NFC device, for example. The electronic device 50' may be affixed to other devices or articles.

Figure 5:
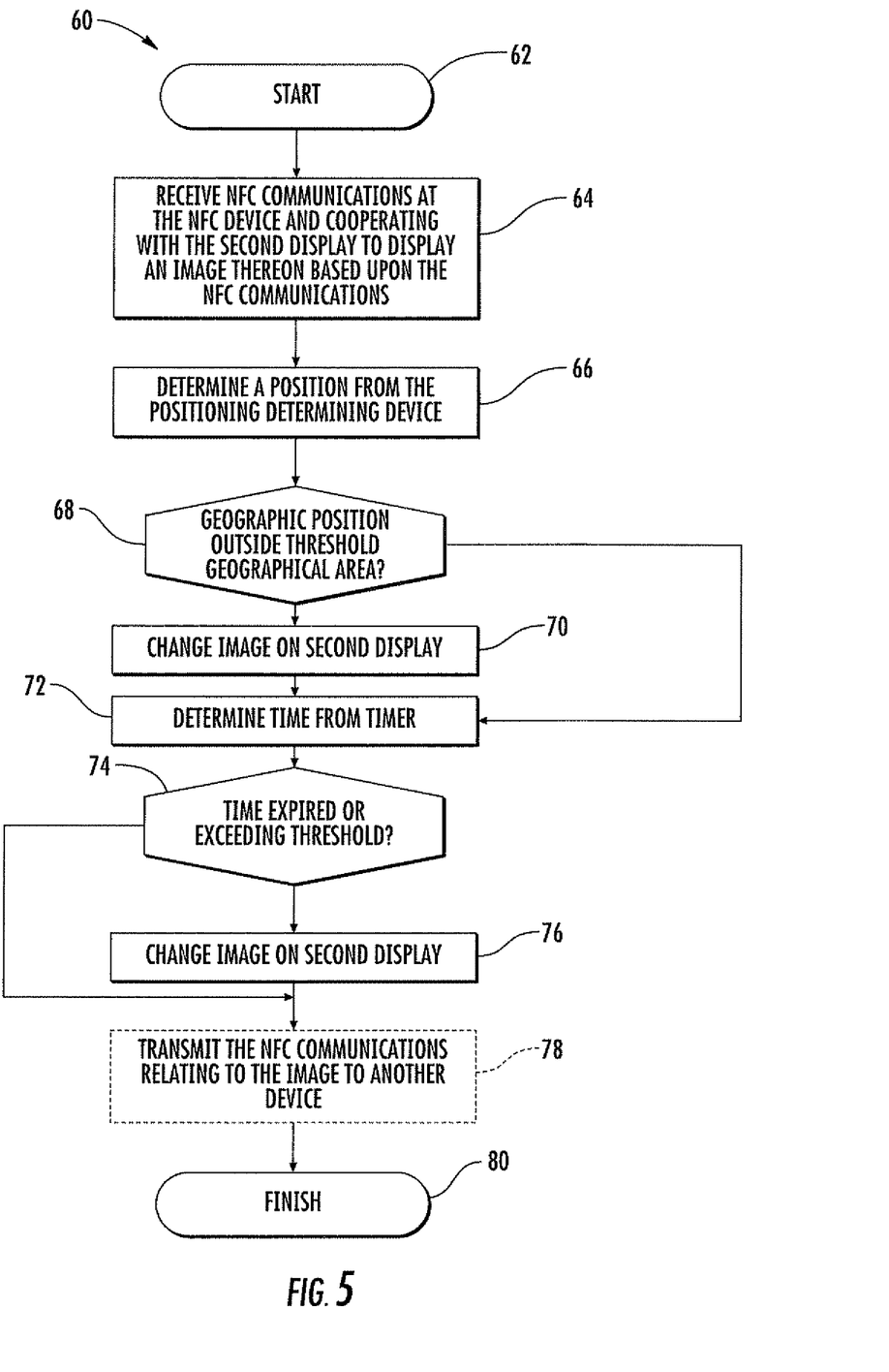
FIG. 5 is a flow diagram illustrating example method aspects associated with the system and devices of FIGS. 1-3.

Referring now to the flowchart 60 of FIG. 5, related method aspects are now described. Beginning at Block 62, the method includes, at Block 64, receiving NFC communications at the NFC device 41 and cooperating with the second display 36 to display an image thereon based upon the NFC communications.

At Block 66, a position is determined from a positioning determining device 44. At Block 68, if the determined geographic position is outside a particular geographical area, the image on the second display 36 is changed, at Block 70. At Block 72, a time is determined from a timer 45. At Block 74, if the time has exceeded a threshold or expired, the image on the second display 36 is changed (Block 76). The method further includes optionally transmitting the NFC communications relating to the image to another device (Block 78). The method ends at Block 80.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
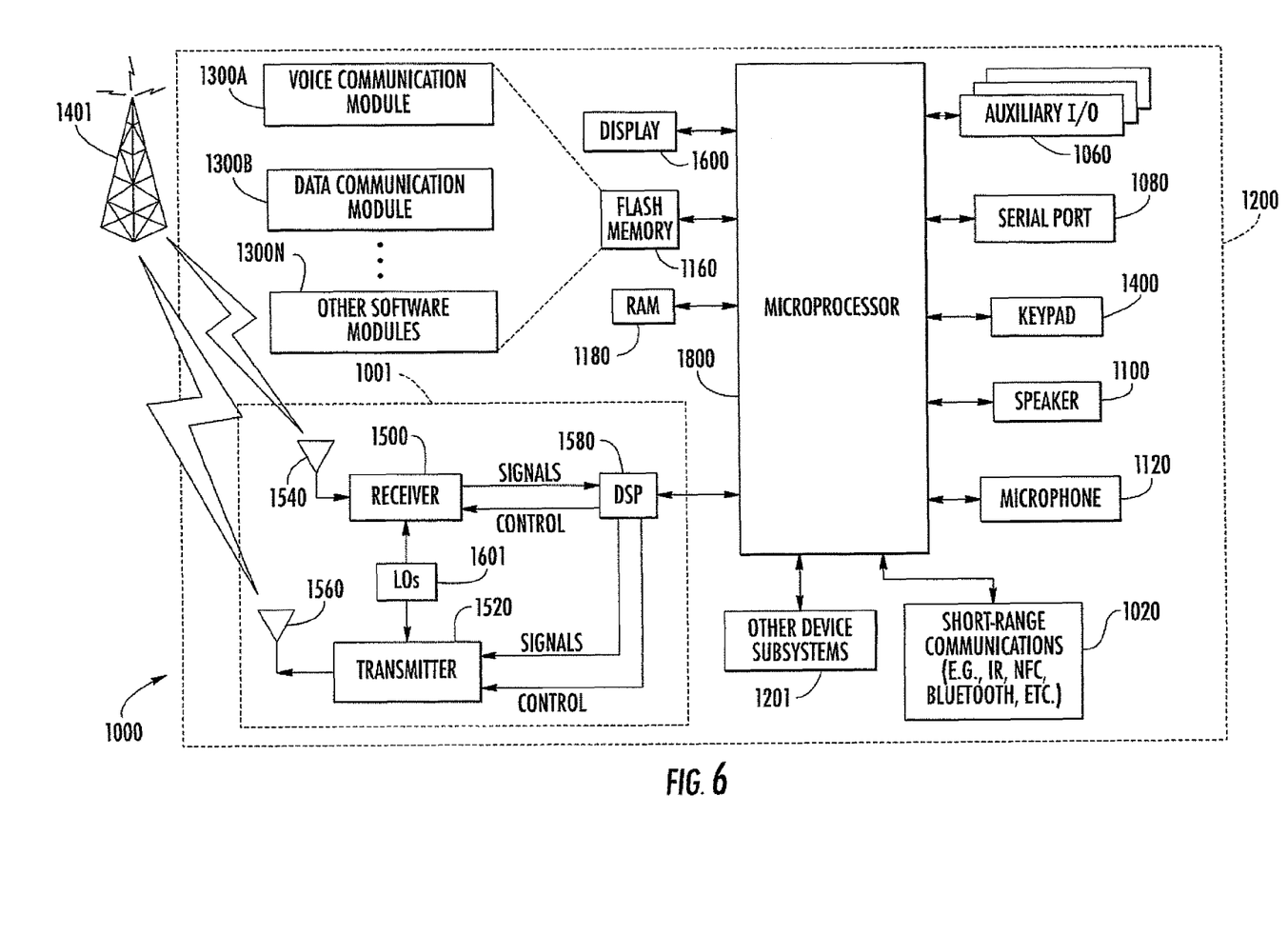
FIG. 6 is a schematic block diagram illustrating example components of a mobile wireless communications device that may be used in accordance with various implementations.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a portable housing having a front exterior surface and a rear exterior surface;
wireless transceiver circuitry carried by said portable housing;
a first active display carried by said front exterior surface of the portable housing;
a processor carried by said portable housing and coupled to said wireless transceiver circuitry and said first display;
a second passive display carried by either the front or rear surface of the portable housing and comprising an array of pixels, each pixel retaining a given state between refreshes and without electrical power supplied thereto; and
a near-field communications (NFC) device connected to and powering said second passive display to display an image thereon based upon NFC communications.

2. The mobile wireless communications device of claim 1, wherein said NFC device and said second display are configured to be powered by a field received by said NFC device.

3. The mobile wireless communications device of claim 1, further comprising a power source carried by said portable housing and coupled to said NFC device.

4. The mobile wireless communications device of claim 1, further comprising a substrate supporting said second display and said NFC device; and an adhesive layer securing said substrate to said portable housing.

5. The mobile wireless communications device of claim 1, wherein said rear exterior surface carries said second display.

6. The mobile wireless communication device of claim 1, further comprising a position determining device carried by said portable housing and configured to change the image on said second display based upon a determined geographic position.

7. The mobile wireless communication device of claim 1, further comprising a timer carried by said portable housing and configured to change the image on said second display based upon time.

8. The mobile wireless communications device of claim 1, wherein said NFC device is configured to transmit an image-related NFC communication to another NFC device.

9. The mobile wireless communications device of claim 1, wherein said second display comprises a color display.

10. A communications system comprising:
a near field communication (NFC) terminal; and
at least one mobile wireless communications device comprising
a portable housing,
wireless transceiver circuitry carried by said portable housing,
a first active display carried by said front exterior surface of the portable housing,
a processor carried by said portable housing and coupled to said wireless transceiver circuitry and said first display,
a second passive display carried by either the front or rear surface of the portable housing and comprising an array of pixels, each pixel retaining a given state between refreshes and without electrical power supplied thereto, and an NFC device connected to and powering said second passive display to display an image thereon based upon NFC communications with said NFC terminal.

11. The communications system of claim 10, wherein said NFC device and said second display are configured to be powered by a field received by said NFC device from said NEC terminal.

12. The communications system of claim 10, wherein said at least one mobile wireless communications device comprises a power source carried by said portable housing and coupled to said NFC device.

13. The communications system of claim 10, wherein said NFC device and said NFC terminal are configured to communicate the image therebetween.

14. The communications system of claim 10, wherein said at least one wireless communications device comprises a plurality of wireless communications devices; and wherein said NFC terminal and said plurality of mobile wireless communications devices are configured to communicate the image therebetween.

15. A communications method for a mobile wireless communications device comprising a portable housing having a front exterior surface and a rear exterior surface, wireless transceiver circuitry carried by the portable housing, a first active display carried by the front exterior surface of the portable housing, a processor carried by the portable housing and coupled to the wireless transceiver circuitry and the first display, a second passive display carried by either the front or rear surface of the portable housing and comprising an array of pixels, each pixel retaining a given state between refreshes and without electrical power supplied thereto, and a near-field communications (NFC) device connected to and powering the second passive display, the method comprising:
  receiving NFC communications at the NFC device and displaying an image on the second display based upon the NFC communications.

16. The method of claim 15, further comprising receiving a field at the NFC device to power the NFC device and the second display.

17. The method of claim 15, further comprising receiving power from a power source carried by the housing and coupled to the NFC device to power the NFC device and the second display.

18. The method of claim 15, further comprising determining a position based upon a positioning determining device and changing the image on the second display based upon the position.

19. The method of claim 15, further comprising determining a time based upon a timer and changing the image on the second display based upon the time.

20. The method of claim 15, further comprising transmitting another NFC communications relating to the image to another NFC device.

* * * * *